(12) United States Patent
Brunner

(10) Patent No.: US 10,895,419 B2
(45) Date of Patent: Jan. 19, 2021

(54) DRYING DEVICE FOR DRYING HYGROSCOPIC MATERIAL TO BE DRIED

(71) Applicant: Reinhard Brunner, Gehrden/Hannover (DE)

(72) Inventor: Reinhard Brunner, Gehrden/Hannover (DE)

( * ) Notice: Subject to any disclaimer, the term of this patent is extended or adjusted under 35 U.S.C. 154(b) by 0 days.

(21) Appl. No.: 16/280,683

(22) Filed: Feb. 20, 2019

(65) Prior Publication Data

US 2019/0257582 A1    Aug. 22, 2019

(30) Foreign Application Priority Data

Feb. 21, 2018  (DE) .................... 10 2018 103 891
Mar. 22, 2018  (DE) .................... 10 2018 106 806

(51) Int. Cl.
*F26B 25/22*   (2006.01)
*F26B 25/00*   (2006.01)
(Continued)

(52) U.S. Cl.
CPC .............. *F26B 25/225* (2013.01); *F26B 3/04* (2013.01); *F26B 9/02* (2013.01); *F26B 9/06* (2013.01);
(Continued)

(58) Field of Classification Search
CPC .. F26B 25/225; F26B 3/04; F26B 9/02; F26B 9/06; F26B 21/001; F26B 21/06;
(Continued)

(56) References Cited

U.S. PATENT DOCUMENTS 4,176,464 A   12/1979  Randolph
4,466,198 A    8/1984  Doll
(Continued)

FOREIGN PATENT DOCUMENTS

CA    2683167 A1    4/2010
CA    2804192 C  *  9/2014  .............. F26B 5/044
(Continued)

OTHER PUBLICATIONS

European Patent Office Office Action dated May 15, 2020 in EPO Application No. 19 157 775.8-1009 (7 pages).

*Primary Examiner* — Stephen M Gravini
(74) *Attorney, Agent, or Firm* — Shlesinger, Arkwright & Garvey LLP

(57) ABSTRACT

Drying device for drying hygroscopic material, for example wood, has a drying chamber for accommodating material to be dried, and air conditioning for setting a drying climate in drying chamber during drying process. Air conditioning sets drying climate, at least in part, as a function of moisture of material to be dried. There are bar-like support devices for storing material to be dried in drying chamber during drying process. At least one bar-like support device has scale for measuring weight of material to be dried that is stored on support device. Scale is in signal transmission connection with a control apparatus designed and programmed so that moisture of material to be dried is determined from weight measured by scale. Control apparatus is designed and programmed for controlling air conditioning so drying climate is set as a function of moisture of the respective material to be dried, as determined from the weight measured.

29 Claims, 4 Drawing Sheets

(51) Int. Cl.
*F26B 9/02* (2006.01)
*F26B 25/06* (2006.01)
*F26B 21/06* (2006.01)
*F26B 3/04* (2006.01)
*F26B 9/06* (2006.01)
*F26B 21/00* (2006.01)

(52) U.S. Cl.
CPC ............ *F26B 21/001* (2013.01); *F26B 21/06* (2013.01); *F26B 25/002* (2013.01); *F26B 25/06* (2013.01); *F26B 2210/14* (2013.01); *F26B 2210/16* (2013.01)

(58) Field of Classification Search
CPC .... F26B 25/002; F26B 25/06; F26B 2210/14; F26B 2210/16
USPC .......................................................... 34/536
See application file for complete search history.

(56) References Cited

U.S. PATENT DOCUMENTS

| | | | | |
|---|---|---|---|---|
| 5,526,583 | A * | 6/1996 | Hull | F26B 9/006 34/191 |
| 8,291,611 | B2 * | 10/2012 | Eriksen | F26B 5/044 34/381 |
| 9,156,185 | B2 * | 10/2015 | Bendiktsen | F26B 25/225 |
| 9,726,429 | B1 * | 8/2017 | Jamaluddin | F26B 25/22 |
| 10,137,432 | B2 * | 11/2018 | Grunewald | B01J 20/3021 |
| 10,344,218 | B2 * | 7/2019 | Pagnozzi | C10B 53/02 |
| 2019/0257582 | A1 * | 8/2019 | Brunner | F26B 21/06 |
| 2019/0310017 | A1 * | 10/2019 | Krebs | F26B 23/005 |

FOREIGN PATENT DOCUMENTS

| | | | | |
|---|---|---|---|---|
| DE | 70913 | | 9/1893 | |
| DE | 516964 | | 1/1931 | |
| DE | 571117 | | 2/1933 | |
| DE | 580 762 | | 7/1933 | |
| DE | 5488 | | 3/1951 | |
| DE | 44 28 001 | A1 | 2/1998 | |
| DE | 10 2005 030 501 | A1 | 1/2007 | |
| DE | 10 2008 045 829 | A1 | 3/2010 | |
| DE | 10 2009 014 853 | A1 | 10/2010 | |
| DE | 10 2010 054 493 | A1 | 6/2012 | |
| DE | 10 2015 110 750 | A1 | 1/2014 | |
| DE | 10 2013 006 639 | A1 | 10/2014 | |
| DE | 102018106806 | A1 * | 8/2019 | ............. F25B 25/06 |
| EP | 2 177 853 | A2 | 10/2008 | |
| EP | 2535156 | B1 * | 10/2014 | ........... B27K 5/0075 |
| EP | 3 190 370 | A1 | 7/2017 | |
| GB | 2195428 | A | 4/1988 | |
| JP | H02140590 | A | 5/1990 | |
| JP | 3065930 | B2 | 7/2000 | |
| JP | 2003094408 | A | 4/2003 | |
| KR | 20140059171 | A * | 5/2014 | ............. B27K 5/009 |
| WO | WO-2012172585 | A3 * | 4/2013 | ............. C10L 5/442 |
| WO | WO-2012003270 | A3 * | 3/2014 | ............. F26B 5/044 |
| WO | WO-2017027813 | A1 * | 2/2017 | ................ F26B 3/28 |

* cited by examiner

DRYING DEVICE FOR DRYING HYGROSCOPIC MATERIAL TO BE DRIED

CROSS-REFERENCE TO RELATED APPLICATIONS

This application claims the priority of German Application No. 10 2018 103 891.7, filed Feb. 21, 2018, and German Application No. 10 2018 106 806.9, filed Mar. 22, 2018, and each of which is incorporated herein by reference.

FIELD OF THE INVENTION

The invention relates to a drying device for drying hygroscopic material to be dried, for example wood, during a drying process.

BACKGROUND OF THE INVENTION

These types of drying devices are generally known, and have at least one drying chamber for accommodating the material to be dried, and an air conditioning means for setting a drying climate in the drying chamber during the drying process in the drying device, the air conditioning means being designed in such a way that the drying climate is set, at least in part, as a function of the moisture of the material to be dried.

For controlling or regulating the drying process, it is essential to determine the moisture of the material to be dried as accurately as possible.

It is known to indirectly determine the variation over time of the moisture of the material to be dried by measuring parameters such as temperature, humidity, air speed, and pressure in the drying chamber. However, it is disadvantageous that the moisture of the material to be dried can be determined only relatively inaccurately.

It is also known to determine the moisture of the material to be dried by measuring the electrical resistance. A corresponding electrical resistance measurement is likewise relatively inaccurate.

When the moisture of the material to be dried can only be determined inaccurately, there is a risk that drying defects will occur due to an undesirable course of the drying process, or that the drying time is prolonged. In addition, the placement of necessary sensors within the drying chamber is laborious and time-consuming. This disadvantage is all the more significant due to the fact that measurement with sufficient accuracy within the scope of control or regulation of the drying process requires a large number of sensors.

Since the material, and with sufficient accuracy also the geometry of the material to be dried, for example sawn timber, are known, it is possible to determine the moisture of the material to be dried by determining its weight, as known from DE 5488, DE 70913, DE 516964, DE 571117, and DE 580762, for example.

It is known from DE 44 28 001 A1 to design the overall drying device as scales, which, however, is very complicated and therefore costly.

A drying device in the form of a drying cart having integrated scales is known from EP 2 177 853 A2.

OBJECTS AND SUMMARY OF THE INVENTION

An object of the invention is to provide a drying device for drying hygroscopic material to be dried, for example wood, in particular sawn timber, in which the determination of the weight of the material to be dried for determining its moisture is simplified.

This object is achieved by the invention set forth herein.

The invention provides that in practice, bar-like support devices, in particular in the form of square timbers, are used, for example in the drying of wood, upon which the packets of stacked wood are placed. For stacked wood, for example, it is thus also possible for the lowest planks in the stack to dry. In addition, the bar-like support devices are used for improved handling of the material to be dried.

On this basis, the concept underlying the invention is to provide a dual function for the bar-like support devices, in that on the one hand they are used for storing the material to be dried, and on the other hand are used according to the invention for measuring the weight of the material to be dried.

In this sense, the invention provides that at least one support device has a measuring means for measuring the weight of the material to be dried that is stored on the support device, the measuring means being in signal transmission connection with a control apparatus that is designed and programmed in such a way that the moisture of the material to be dried is determined from the weight that is measured by the measuring means, the control apparatus being designed and programmed for controlling the air conditioning means in such a way that the drying climate is set as a function of the determined moisture.

According to the invention, the weight of the material to be dried that is stored on the support device is thus determined by the measuring means, which may take place continuously during the drying operation. In this way, information concerning the (residual) moisture of the material to be dried is available during the drying process, so that the drying process may be controlled or regulated with high accuracy and energy efficiency.

As a result, the determination of the moisture by determining the weight of the material to be dried is significantly simplified and made more accurate.

In addition, drying defects are avoided and the drying time may be optimized.

Another advantage of the invention is that damage to the material to be dried, which occurs in known methods due to measuring probes being driven into the material to be dried, is avoided.

The number of bar-like support devices having a measuring means is selectable within wide limits, depending on the particular requirements.

In principle, it is sufficient to use only a single support device having a measuring means that is designed according to the invention, or several such support devices, in a drying chamber. However, to improve the spatial resolution of the determination of the moisture of the material to be dried, a plurality of bar-like support devices having such a measuring means may be used for storing a plurality of wood stacks, for example. The more support devices of this type that are present, the higher the spatial resolution of the determination of the moisture based on the base area of the drying device.

The bar-like support devices according to the invention, depending on the particular requirements, may be used alone or in combination with other measuring devices for measuring the moisture of the material to be dried.

One advantageous further embodiment of the invention provides that at least one bar-like support device having a measuring means is designed as a stacking aid for stacking the material to be dried. In this embodiment, for example stacked wood is placed on the bar-like support device, which thus forms a stacking aid for arranging the wood stack in the drying chamber.

Another advantageous further embodiment of the invention provides that at least one bar-like support device having a measuring means is designed to rest on a base surface, in particular the base of a drying chamber or a stacking cart. In this embodiment, the bar-like support device in question rests on the base during the drying process, with the material to be dried being supported on the support device. However, according to the invention it is also possible to provide a bar-like support device, having at least one measuring means, within a stack of material to be dried, so that the determination of the weight is based solely on the portion of the stack situated above the support device. According to the invention, it is also possible to provide at least one support device, designed according to the invention and having a measuring means, on the base and also in a stack of material to be dried.

The spatial arrangement of measuring sensors of the measuring means on the bar-like support device in question is selectable within wide limits, depending on the particular requirements. In this regard, one advantageous further embodiment of the invention provides that at least one measuring sensor of the measuring means is integrated into the bar-like support device.

According to the invention, in principle it is sufficient when the weight of the material to be dried is measured at a single measuring point by each bar-like support device having a measuring means. To enhance the spatial resolution of the measurement in the longitudinal direction of the support device, one advantageous further embodiment of the invention provides that at least one bar-like support device has two spaced-apart measuring points, and the measuring means is designed to measure, at separate measuring points, the weight of the material to be dried.

In principle, at least one bar-like support device having a measuring means may be fixedly arranged or mounted in a drying chamber. To improve the flexibility of the drying device, for example and in particular with regard to drying, for example, timber packages of different dimensions (width/length/height), one advantageous further embodiment of the invention provides that at least one bar-like support device having a measuring means has a mobile design for transfer within the drying device. In this way, the bar-like support device in question may be freely positioned or repositioned at a desired location within the drying device.

To simplify handling of the support device or support devices in the above-mentioned embodiment, one advantageous further embodiment provides that at least one bar-like support device having a measuring means includes a handling aid for handling of the support device by a handling device, in particular a forklift.

One further embodiment of the above-mentioned embodiment provides that the handling aid has two spaced-apart openings for the engagement of a fork of a forklift.

A signal transmission from the measuring means to the control apparatus may take place in a wired manner. To further increase the flexibility with regard to the arrangement of the support device in the drying device, another advantageous further embodiment of the invention provides that the measuring means is in signal transmission connection with the control apparatus wirelessly, in particular by radio. In practice, the control apparatus is stationarily mounted, and may in particular be formed by a control computer. In this embodiment, each bar-like support device having a measuring means does not depend on a connection to stationary signal lines, so that the flexibility of the spatial arrangement within the drying device is further increased. If, depending on the particular sensor principle, measuring sensors of the sensor means require a power supply, it may be provided by a battery or an accumulator, so that the support device is then independent of an external power supply.

The sensor principle used for determining the weight of the material to be dried is selectable within wide limits, depending on the particular requirements. In this regard, advantageous further embodiments of the invention provide that at least one sensor of the measuring means is designed as a force transducer, and/or that at least one measuring sensor of the measuring means is designed as a load cell.

To make the bar-like support devices having the measuring means insusceptible to damage, another advantageous further embodiment of the invention provides that at least one bar-like support device having a measuring means includes a base body and a support element that is movable relative to the base body and is connected to at least one measuring sensor, with locking means being provided for locking the support element to the base body. In the locked position, a movement of the support element relative to the base body is prevented, so that damage to the measuring sensor to which the support element is connected is reliably avoided during transport, thus providing transport security.

Another advantageous further embodiment of the invention provides that the control apparatus is designed and programmed for temporally resolved determination of the moisture of the material to be dried, during the drying operation. The moisture of the material to be dried may be determined continuously or at intervals during the drying process. The higher the temporal resolution in determining the moisture of the material to be dried, the more precisely the drying process may be controlled or regulated.

To make the bar-like support devices designed according to the invention particularly simple, robust, and economical, one advantageous further embodiment of the invention provides that at least one bar-like support device having a measuring means is designed, at least in sections, as a hollow profile, and at least one measuring sensor of the measuring means is accommodated in the cavity of the hollow profile. Such hollow profiles are available as relatively inexpensive, robust standard parts. Sensors accommodated in the cavity are protected from damage.

One advantageous further embodiment of the above-mentioned embodiment provides that at least one bar-like support device having a measuring means is made, at least in part, of metal, in particular nonrusting metal such as aluminum.

A bar-like support device according to the invention is set forth in Claim 17. Advantageous and practical further embodiments of the support device according to the invention are set forth in subclaims 18 through 30. The same properties and advantages correspondingly result as for the drying device according to the invention and its further embodiments.

The invention is explained in greater detail below based on one embodiment, with reference to the appended highly schematic drawings. All features described, illustrated in the drawings, and claimed in the patent claims, alone or in any given suitable combination, constitute the subject matter of the invention, regardless of their recapitulation in the patent claims or their back-reference, and regardless of their description, or illustration in the drawings.

Relative terms such as left, right, up, and down are for convenience only and are not intended to be limiting.

DETAILED DESCRIPTION OF THE INVENTION

One embodiment of a drying device according to the invention is explained in greater detail below, with reference to FIGS. 1 through 4.

Figure 1:
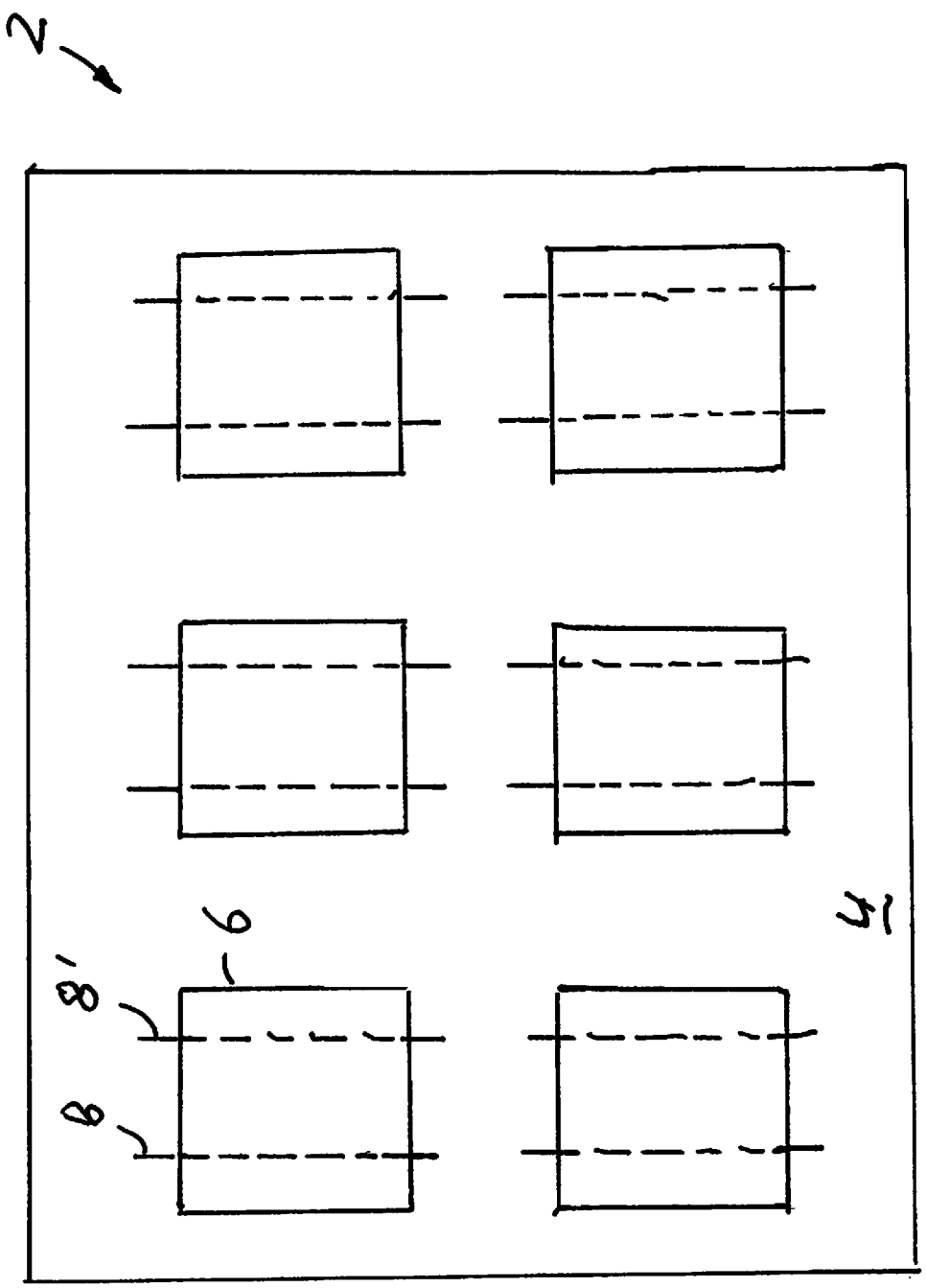
FIG. 1 shows a highly schematic layout of one embodiment of a drying device according to the invention.

FIG. 1 shows a highly schematic layout of one embodiment of a drying device 2 according to the invention, which in this embodiment is designed as a wood drying device that is loaded by a forklift, and used for drying sawn timber placed in stacks, i.e., stacked wood.

In this embodiment, the drying device 2 has a single drying chamber 4, which, however, is to be understood strictly as an example. Depending on the particular requirements, the drying device 2 may have a plurality of drying chambers 4 that are separate from one another or that can communicate with one another. The basic design of such drying devices is generally known to those skilled in the art, for example from DE 10 20005 030 501 A1, DE 10 2008 045 829 A1, DE 10 2009 014 853 A1, DE 10 2010 054 493 A1, DE 10 2013 006 639 A1, DE 10 2015 110 750 A1, and DE 10 2016 100 206, and therefore is not explained here in greater detail.

During a drying process, in which stacked wood is dried by means of the drying device 2, wood stacks, of which only one wood stack, denoted by reference numeral 6, is schematically illustrated in FIG. 1, are arranged in the drying chamber 4. As stacking aids, bar-like support devices are provided that are arranged essentially in parallel in and spaced apart from one another; in FIG. 1, only two such support devices, which are used for storing the wood stack 6, and denoted by reference numerals 8, 8', are provided.

The drying device 2 also has an air conditioning means 10 (see FIG. 2) for setting a drying climate in the drying chamber 4 during a drying process. The air conditioning means may, for example and in particular, have recirculation fans, heating registers, and feed and exhaust air dampers, which, however, are not shown in order to simplify the illustration.

The air conditioning means 10 is designed in such a way that the drying climate in the drying chamber is set, at least in part, as a function of the moisture of the material to be dried.

According to the invention, at least one support device 8 has a measuring means for measuring the weight of the material to be dried that is stored on the support device, as explained in greater detail below for the support device 8 with reference to FIGS. 3 and 4. The measuring means 12 is in signal transmission connection with a control apparatus 14 (see FIG. 2), which is designed and programmed in such a way that the moisture of the material to be dried is determined from the weight that is measured by the measuring means. For controlling the air conditioning means 10, the control apparatus 14 is designed and programmed in such a way that the drying climate is set as a function of the respective moisture of the material to be dried that is determined by the measuring means.

Figure 2:
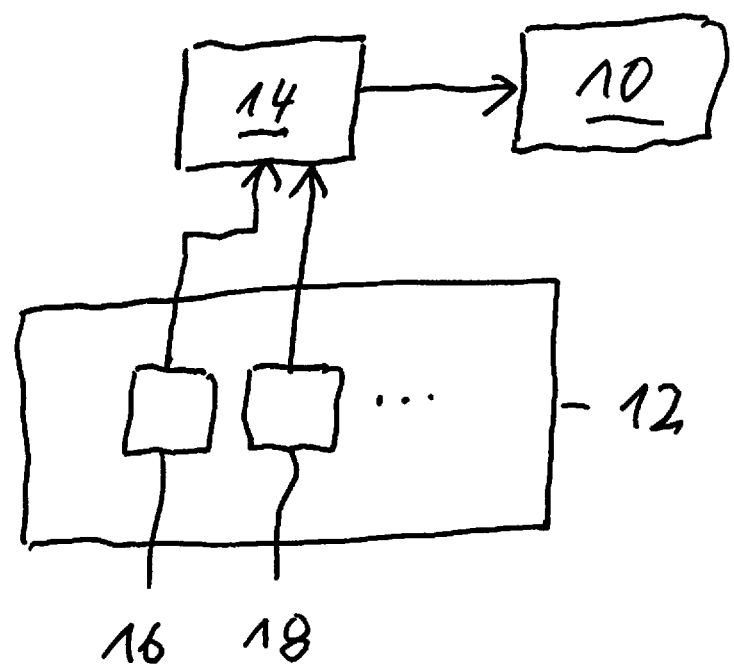
FIG. 2 shows a block diagram of the drying device according to FIG. 1.

Depending on the particular requirements, the measuring means 12 may have a plurality of measuring sensors, of which only two measuring sensors 16, 18 are illustrated in FIG. 2.

Figure 3:
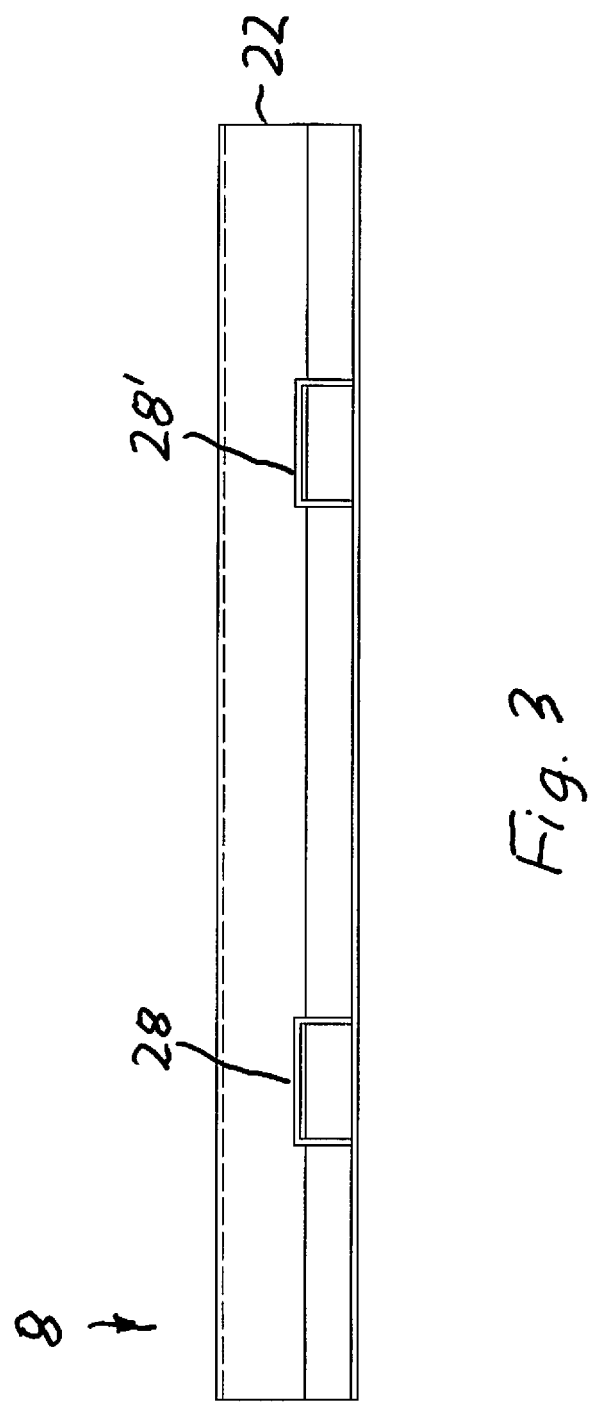
FIG. 3 shows a side view of a bar-like support device designed according to the invention.

FIG. 3 shows a side view of the bar-like support device 8, which in the illustrated embodiment is used as a stacking aid for stacking the material to be dried. As is apparent from FIG. 1, the wood stack 6, for example, is supported on the support devices 8, 8' during the drying process in the drying chamber 4. The support devices 8, 8' are designed to rest on the base of the drying chamber 4, and may be provided with a slip-resistant means such as grooves or other profilings on its bottom side.

In the illustrated embodiment, at least one measuring sensor 16 of the measuring means is integrated into the bar-like support device 8. In the illustrated embodiment, the support device 8 is designed as a hollow profile 20 made of metal, with at least one measuring sensor 16 of the measuring means being accommodated in the cavity of the hollow profile 20. The sensor principle of the measuring sensors of the measuring means 12 may be selected depending on the particular requirements. In the illustrated embodiment, the measuring sensor 16 is designed as a load cell.

The support device 8 has a base body 22, and a support element 24 that is movable relative to the base body 22 and is connected to the load cell 16 via a pressure-resistant connecting element 23.

Figure 4:
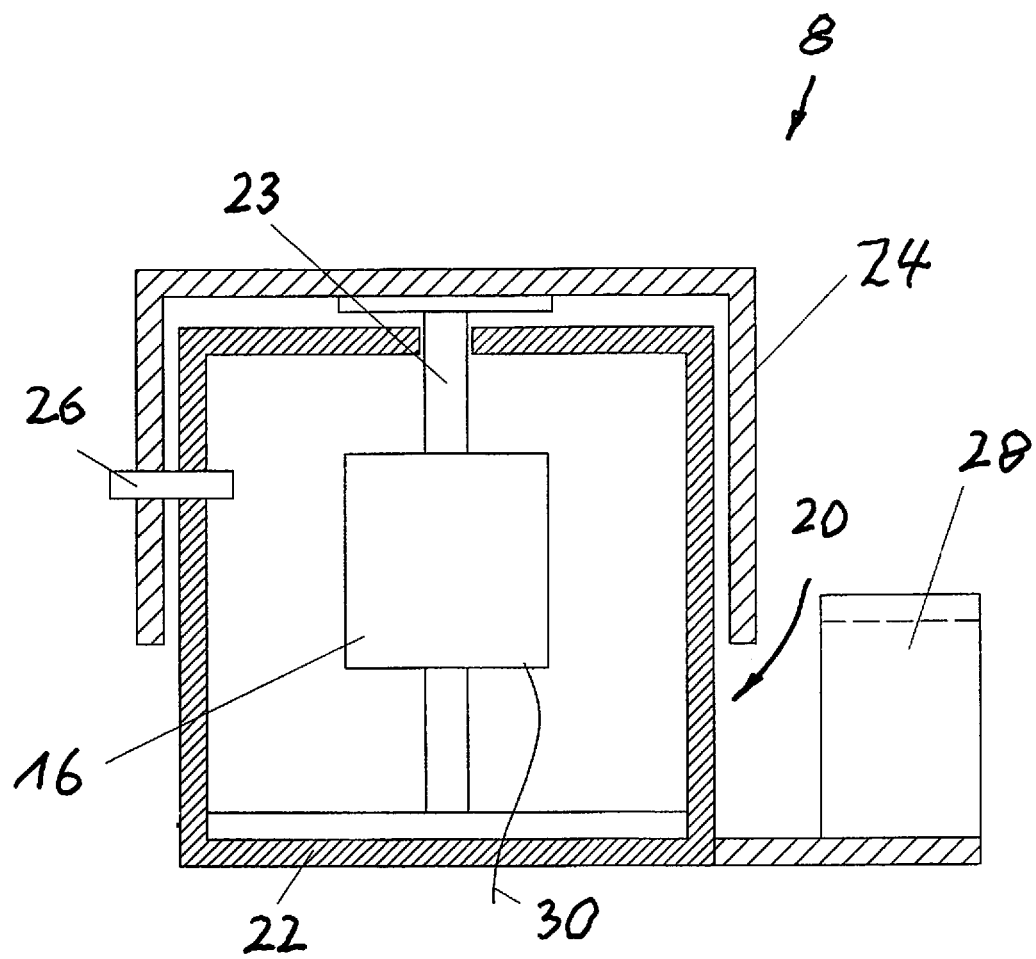
FIG. 4 shows a highly schematic cross section of the support device according to FIG. 3.

For locking the support element 24, a locking means 26 is provided on the base body 22 as transport security, as indicated purely schematically in FIG. 4.

Depending on the particular requirements, each bar-like support device 8 having a measuring means may include a single measuring sensor or a plurality, for example a plurality of measuring sensors spaced apart from one another in the longitudinal direction of the support device 8, so that the weight measurement may be carried out in the longitudinal direction of the support device at a single location or at multiple locations.

For transferring the support device 8 within the drying device 2, the support device 8 has handling aids for handling the support device 8 by a handling device. In the illustrated embodiment, the handling aids are formed by two spaced-apart openings 28, 28' for the engagement of a fork of a forklift, which in the illustrated embodiment have an eyelet-like design.

In FIG. 4, reference numeral 30 indicates that the signal transmission from the load cell 16 to the control apparatus 14 may take place in a wired manner. However, the signal transmission may also take place wirelessly.

The wood stack 6 is supported on the support devices 8, 8' during operation of the drying device 2. During the drying process, the changing weight of the wood stack 6 corresponding to the progress of the drying process is continuously measured using the measuring means that is integrated into the support device 8, so that at the control apparatus 14, the (residual) moisture of the material to be dried may be continuously determined, and the drying process may be controlled or regulated by appropriate actuation of the air conditioning means 10.

According to the invention, each of the bar-like support devices 8, 8' used may have a measuring means. However, according to the invention it is also sufficient for only particular single support devices that are used to have a measuring means.

The invention allows the moisture of the material to be dried to be easily determined during a drying process.

As a result of the support devices 8, 8' having a mobile design, they may be positioned or repositioned within the drying chamber 4, depending on the particular requirements.

More than two bar-like support devices 8, 8' may also be used for supporting a wood stack 6, if necessary.

The invention may find application on any given drying devices, for example and in particular on drying devices that are loaded by a forklift or rail car, or progressive kilns. Depending on the particulars of the drying device in question and the associated drying process, the bar-like support devices may be stationarily mounted during the drying process, or may move together with the material to be dried.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

The invention claimed is:

1. A drying device for drying hygroscopic material to be dried, during a drying process, comprising:
   a) at least one drying chamber for accommodating the material to be dried;
   b) an air conditioning means for setting a drying climate in the drying chamber during a drying process;
   c) the air conditioning means being designed in such a way that the drying climate is set, at least in part, as a function of a moisture of a material to be dried;
   d) bar-like support devices for storing the material to be dried in the drying chamber during the drying process;
   e) at least one bar-like support device having a measuring means for measuring a weight of the material to be dried that is stored on the bar-like support devices;
   f) the measuring means being in signal transmission connection with a control apparatus that is designed and programmed in such a way that the moisture of the material to be dried is determined from the weight that is measured by the measuring means; and
   g) the control apparatus being designed and programmed for controlling the air conditioning means in such a way that the drying climate is set as a function of the moisture of the respective material to be dried that is determined by the measuring means.

2. The drying device according to claim 1, wherein:
   a) at least one bar-like support device having a measuring means is designed as a stacking aid for stacking the material to be dried.

3. The drying device according to claim 1, wherein:
   a) at least one bar-like support device having a measuring means is designed to rest on a base surface, in particular the base of a drying chamber or a stacking cart.

4. The drying device according to claim 1, wherein:
   a) at least one measuring sensor of the measuring means is integrated into one of the bar-like support devices.

5. The drying device according to claim 1, wherein:
   a) at least one bar-like support device has two spaced-apart measuring points, and the measuring means is designed to measure, at separate measuring points, the weight of the material to be dried.

6. The drying device according claim 1, wherein:
   a) at least one bar-like support device having a measuring means has a mobile design for transfer within the drying device.

7. The drying device according to claim 6, wherein:
   a) at least one bar-like support device having a measuring means includes a handling aid for handling of the support device by a handling device.

8. The drying device according to claim 7, wherein:
   a) the handling aid has two spaced-apart openings for the engagement of a fork of a forklift.

9. The drying device according to claim 1, wherein:
   a) the measuring means is in signal transmission connection with the control apparatus wirelessly.

10. The drying device according to claim 1, wherein:
    a) at least one measuring sensor of the measuring means is designed as a force transducer.

11. The drying device according to claim 1, wherein:
    a) at least one measuring sensor of the measuring means is designed as a load cell.

12. The drying device according to claim 1, wherein:
    a) at least one bar-like support device having a measuring means includes a base body and a support element that is movable relative to the base body and is connected to at least one measuring sensor, with locking means being provided for locking the support element to the base body.

13. The drying device according to claim 1, wherein:
    a) the control apparatus is designed and programmed for temporally resolved determination of the moisture of the material to be dried, during the drying operation.

14. The drying device according to claim 1, wherein:
    a) at least one bar-like support device having a measuring means includes, at least in sections, a hollow profile, and at least one measuring sensor of the measuring means is accommodated in a cavity of the hollow profile.

15. The drying device according to claim 14, wherein:
    a) at least one bar-like support device having a measuring means is made, at least in part, of nonrusting metal.

16. The drying device according to claim 1, wherein:
    a) the drying device is designed as a wood drying device.

17. A bar-like support device for temporarily storing stored material to be dried in a drying chamber during a drying process, comprising:
    a) the bar-like support device having a measuring means for measuring a weight of the material to be dried that is stored on the support device;
    b) the measuring means being or may be brought into signal transmission connection with a control apparatus, which is designed and programmed in such a way that at least the moisture of material to be dried, is determined from the weight that is measured by the measuring means; and
    c) the support device includes, at least in sections, a hollow profile, and at least one measuring sensor of the measuring means is accommodated in a cavity of the hollow profile.

18. The support device according to claim 17, wherein:
    a) the support device is designed as a stacking aid for stacking the stored material to be dried.

19. The support device according to claim 17, wherein:
    a) the support device is designed to rest on a base.

20. The support device according to claim 17, wherein:
    a) at least one measuring sensor of the measuring means is integrated into the support device.

21. The support device according to claim 17, wherein:
a) the support device has two spaced-apart measuring points, and the measuring means is designed to measure, at separate measuring points, the weight of the material to be dried.

22. The support device according to claim 17, wherein:
a) the support device has a mobile design for transfer within a drying device.

23. The support device according to claim 22, wherein:
a) the support device includes a handling aid for handling of the support device by a handling device.

24. The support device according to claim 23, wherein:
a) the handling aid has two spaced-apart openings for the engagement of a fork of a forklift.

25. The support device according to claim 17, wherein:
a) the measuring means is in signal transmission connection with the control apparatus wirelessly.

26. The support device according to claim 17, wherein:
a) at least one measuring sensor of the measuring means is designed as a force transducer.

27. The support device according to claim 17, wherein:
a) at least one measuring sensor of the measuring means is designed as a load cell.

28. The support device according to claim 17, wherein:
a) the support device includes a base body and a support element that is movable relative to the base body and is connected to at least one measuring sensor, with locking means being provided for locking the support element to the base body.

29. The support device according to claim 17, wherein:
a) the support device is made, at least in part, of metal.

* * * * *